United States Patent
Cutter

[15] 3,670,464
[45] June 20, 1972

[54] AIRCRAFT HANGARS

[72] Inventor: Robert C. Cutter, Box 1074, Glenwood Springs, Colo. 81601

[22] Filed: May 6, 1970

[21] Appl. No.: 35,067

[52] U.S. Cl..................................52/30, 52/65, 52/175, 52/236, 52/237, 214/16.1 A
[51] Int. Cl.................................................E04h 6/16
[58] Field of Search..................52/175, 174, 176, 276, 237, 52/234, 65, 73, 30; 214/16.1 A

[56] References Cited

UNITED STATES PATENTS

| | | | |
|---|---|---|---|
| 3,571,990 | 3/1971 | Rossman | 52/30 |
| 1,528,893 | 3/1925 | Rother | 214/16.1 A |
| 1,751,721 | 3/1930 | Bellmann | 214/16.1 C |
| 1,855,534 | 4/1932 | Williams | 214/16.1 A |
| 1,861,461 | 6/1932 | Traube | 214/16.1 A |
| 2,964,144 | 12/1960 | Wheeler | 52/65 |

Primary Examiner—Price C. Faw, Jr.
Attorney—William D. Stokes

[57] ABSTRACT

A circular hangar for aircraft with at least two decks having a central rotating support pillar supporting the decks for rotation. The decks are support tracks extending radially from the pillar, with the tracks for adjoining decks close together, but staggered vertically an amount sufficient for the wings of aircraft on the decks to clear. A clustered assembly includes two of the hangars with a single elevator positioned between them so as to serve both. The hangars closely pack the aircraft, providing increased and efficient land use without undue height of the hangars.

19 Claims, 10 Drawing Figures

PATENTED JUN 20 1972 3,670,464

INVENTOR.
ROBERT C. CUTTER
BY William A. Stokes
ATTORNEY

INVENTOR.
ROBERT C. CUTTER

INVENTOR
ROBERT C. CUTTER
BY *William W. Stokes*
ATTORNEY

INVENTOR
ROBERT C. CUTTER
BY William A. Stokes
ATTORNEY

AIRCRAFT HANGARS

The invention relates to hangars and similar enclosures for aircraft. More specifically, this invention relates to hangars having more than one storage levels and to clusters of such hangars.

Strict height restrictions on building and other structures are often observed in the vicinity of air landing fields. At the same time, available land is often expensive or relatively scarce.

It is desirable, of course, to park and store aircraft in a building in which the aircraft is not subject to severe, violent, or other weather conditions capable of causing damage.

Garages and the like for vehicles other than aircraft having stacked rotatable levels are reasonably well known. Corresponding structures apparently are not found in the art of aircraft hangars. At least one prior teaching is to a hangar of essentially one room in which alternate aircraft are lifted on stands so that the wings overlap. Single decked hangars rotatable for convenient access for the aircraft are also known, but effective multi-deck storage of aircraft apparently is not found in the art.

It is a primary object of this invention to provide for convenient, efficient and practical hangars for use near airports and other air landing fields.

It is a more specific object of this invention to provide hangars for use near airports and other air landing fields constructed in accordance with a simple and efficient design.

It is another object of this invention to provide a convenient and useful multi-level hangar of low height.

It is still another object of this invention to provide convenient and useful clusters of hangars.

In accordance with this invention a hangar for winged aircraft is constructed having at least two horizontal levels with floors displaced vertically so that the wings of aircraft supported on one of the two levels clear (do not interfere physically with) adjacent aircraft on the other level. The floor of at least the higher level is discontinuous so that part of the bodies of aircraft supported on the lower level extend past and occupy space above the level of the floor of the higher level. The floor parts of the higher level are located at positions displaced horizontally distances sufficient so that the bodies of aircraft supported on the higher level clear the bodies of aircraft on the next lower level. Both floor levels are mounted for rotation as a unit.

An elevator may be used to bring aircraft to the upper levels. Two or more of the hangars may be positioned near a single elevator so that the elevator serves the plurality of hangars.

These and other objects, features, and advantages will be more apparent from the following discussion of a preferred embodiment of the invention as illustrated by the accompanying drawings.

Figure 1:
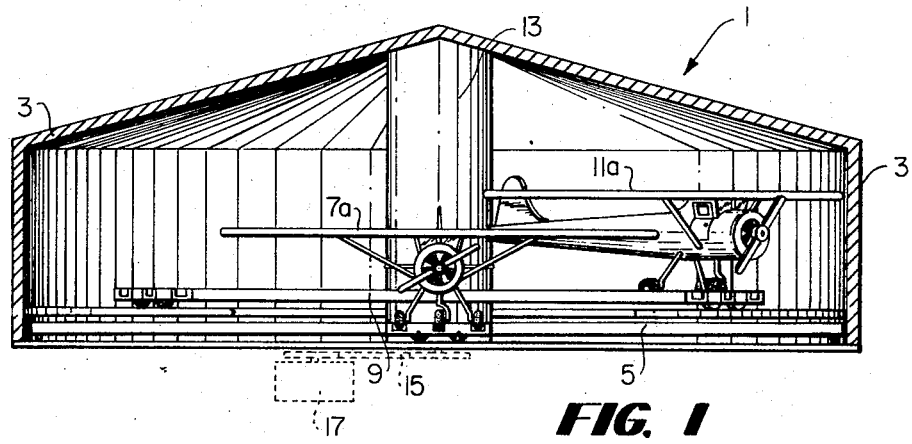
FIG. 1 is a section view of the hangar storing aircraft on both levels.

As shown in FIG. 1, the external form of the hangar 1 is of generally conventional construction and design suited to protect aircraft from wind damage and other consequences of adverse weather. The walls 3 and heating capabilities may be essentially the same as those used in conventional garages and hangars.

Hangar 1 contains a first floor 5 on the lower level, upon which winged aircraft 7 are supported. The second floor 9 is at a higher level and supports aircraft 11.

Figure 2:
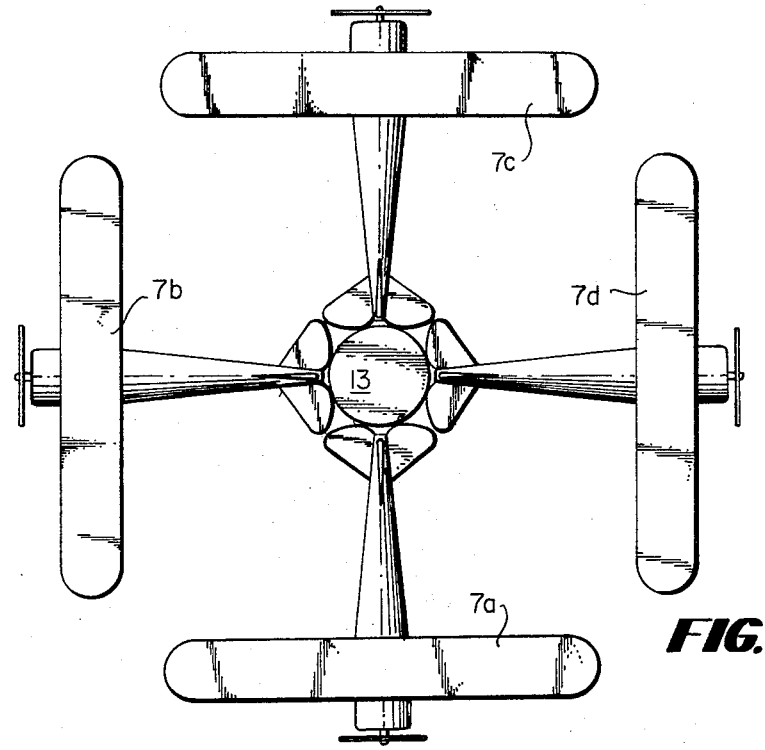
FIG. 2 is a view from the top looking down on the first floor of the hangar.

FIG. 2 is a top view looking down on floor 5 when a maximum number of aircraft 7a, 7b, 7c, and 7d are stored.

Figure 3:
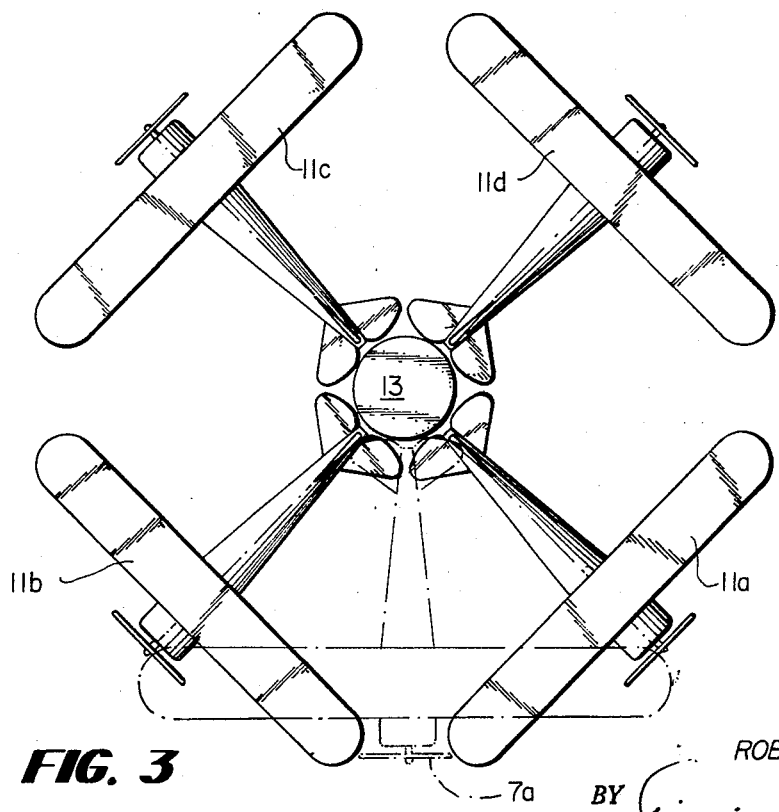
FIG. 3 is a view from the top looking down from the same position as FIG. 2 on the second floor of the hangar and showing in dotted outline one aircraft supported on the first floor.

FIG. 3 illustrates aircraft 11a, 11b, 11c, and 11d stored on the top floor 9 when it is filled to capacity of aircraft in the preferred embodiment as illustrated. Aircraft 7a is shown in dotted outline to illustrate the spacing between the two levels. The wings of aircraft 7 when positioned on floors 5 extend horizontally to underlie the wings and may extend further to overlap the part of the main body portion of aircraft 11, but are positioned below these portions sufficient so as not to physically interfere with them. Similarly, the wings of aircraft 11 when positioned on floor 9 overlie the wings and may overlay the main body portion of aircraft 7, but are positioned above those portions sufficient to clear them.

The rotating inner structure of the hangar 1 is supported at the center by a rotatable column 13. Column 13 acts in the nature of a hub while providing necessary support for upper level floor 9. Column 13 preferably extends farther up to provide support for the roof of hangar 1.

Figure 4:
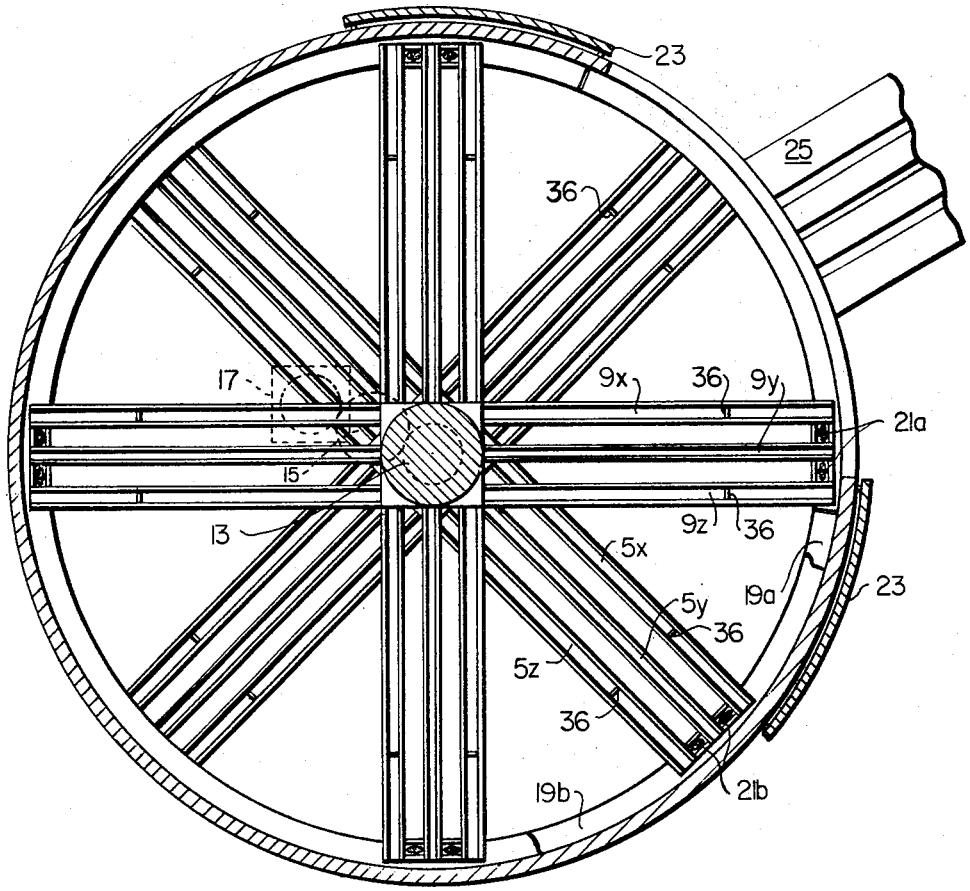
FIG. 4 is a top view illustrating the structure of the floors and major elements contributing to rotation of the floors.

FIG. 4 illustrates the preferred structural elements making up the rotatable floors. At the center is column 13 linked at 15 by gears, friction drive, or the like to a power source, preferably to an electric motor 17. Motor 17 is, of course, connected to start-and-stop switch for manual control.

The sets of three tracks 9x, 9y, 9z, comprising the part of upper floor 9, for holding one aircraft are shown in detail in FIG. 4. As illustrated, in the preferred embodiment, four sets of tracks exist equally spaced within hangar 1 to make up a floor 9 capable of supporting four aircraft. Similarly, four sets of three tracks 5x, 5y, 5z, each set adapted to hold one aircraft, comprise the lower floor 5 and are shown in FIG. 4.

The sets of tracks 9x, 9y, 9z and 5x, 5y, 5z are essentially the same. All the tracks 5 and 9 are channelled to prevent aircraft wheels from moving off them. The center track 5y and 9y are smaller than outer tracks 5x, 5z, 9x, 9z so that the inner track will confine landing gear wheels received to thereby position the center of the craft while the outer tracks, while not of great width, are wide enough to accommodate various wheel base sizes. Each extends from center column 13 to outer wall 3. Outer wall 3 provides outer tracks 19a (upper level) and 19b (lower level) of concrete or other sturdy construction, each of which extends continuously around the outside of hangar 1. Tracks 9x, 9y, 9z carry at their outer end a spaced set of wheels 21a or bearings which are held in and guided by outer track 19a. Similarly tracks 5x, 5y, 5z carry a spaced set of wheels 21b which ride in track 19b.

As an alternative to motor 17 driving column 13, one or more of the sets of wheels 21 may be driven. Also, during a power failure or for any other reason, the structure can be rotated manually. To facilitate rotation care is taken to assure that the outer tracks 19 are level.

The hangar 1 is circular, and the ground level outer support track 19b is integral with the foundation for the outer wall 3 of hangar 1. A sliding door 23 is positioned to open at the location of the elevator 25. The hangar may be constructed with outer walls 3 encompassing both the rotating inner structure and the elevator 25. Preferably, however, the elevator 25 services two hangars as described below, and in any event the elevator 25 need not be a part of the hangar.

Figure 5:
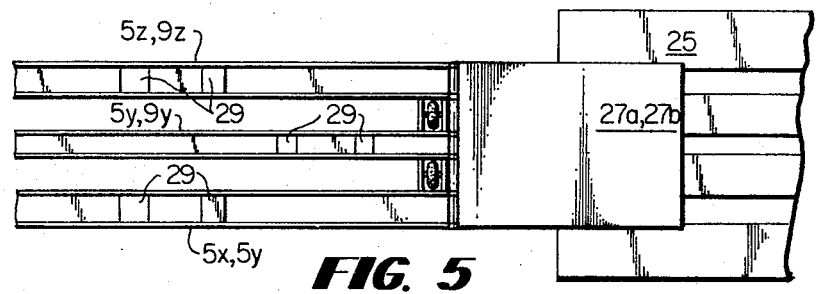
FIG. 5 is a top view of the end of the floor tracks with the extension down to communicate with the elevator.
Figure 6:
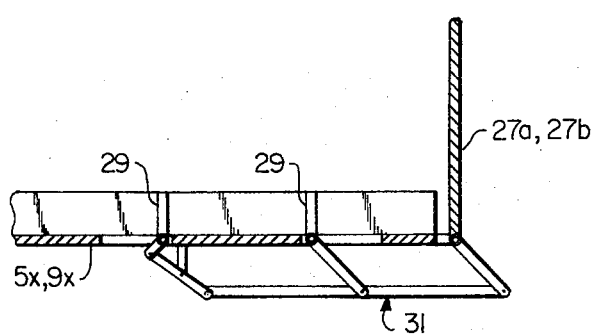
FIG. 6 is a side view of the structure shown in FIG. 5 with the extension lifted for movement of the inner floors of the hangar.

As illustrated in FIGS. 5 and 6, on the outer end of the floor tracks 5x, 5y, 5z or 9x, 9y, 9z, are mounted extension members 27a (for the upper floor) and 27b (for the lower floor) designed to fold upward in the manner of a drawbridge. When lowered, as shown in FIG. 5, extensions 27 act as a bridge connecting the tracks constituting the floors to the elevator 25. Each extension 27a is directly linked to wheel stops 29 on the spokes 9x, 9y, 9z to which it is attached. Similarly, each extension 27b is linked to stops 29 on spokes 5x, 5y, 5z.

Raising of the extensions 27 during rotating as shown in FIG. 6 operates through a linkage 31 to cause the wheel stops 29 to raise to an extended position obstructing both sides of landing gear wheels and thereby preventing aircraft carried on the corresponding tracks 5 or 9 from shifting while the inner structure is being rotated. When an extension 27 is lowered, stops 29 are automatically moved below or even with the corresponding tracks 5 or 9 so that the aircraft may be moved freely to and from the hangar.

Various safety devices will be incorporated in the design depending upon relative costs and skill and care of those who will be expected to use the hangar. An electrical interlock could be installed to prevent rotation of the floors when an extension 27 is lowered. Where the specific design does not require an extension 27 for use at the ground level, condition responsive mechanism or circuitry could be provided to prevent lowering of an extension 27 when the elevator 25 is not at the top level.

Figure 7:
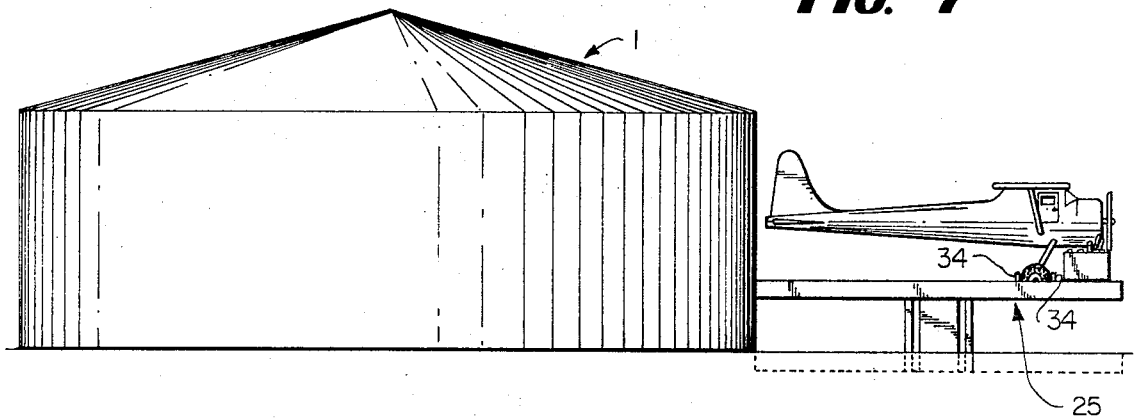
FIG. 7 is a side view showing the elevator delivering aircraft to the hangar.

FIG. 7 illustrates the elevator 25 carrying an aircraft to the upper level in the normal position during use. Since a primary application of hangar 1 is for storage of light, single engine airplane, which rarely weigh more than the average American made automobile, a pneumatic lift similar to those used in automobile garages is suitable with elevator 25. The total lift necessary for the hangar 1 is not more than about 6 or 7 feet, since the upper floor 9 is above floor 5 only enough for the wings of aircraft to clear the body parts of aircraft on adjacent floors at locations to which they extend. Of course, the elevator 25 would not be used for unloading or loading the lower ground level floor other than for the aircraft to move across the elevator floor. Recess of the lift platform into the ground would not be necessary so long as the tracks 32 are at ground level.

Figure 8:
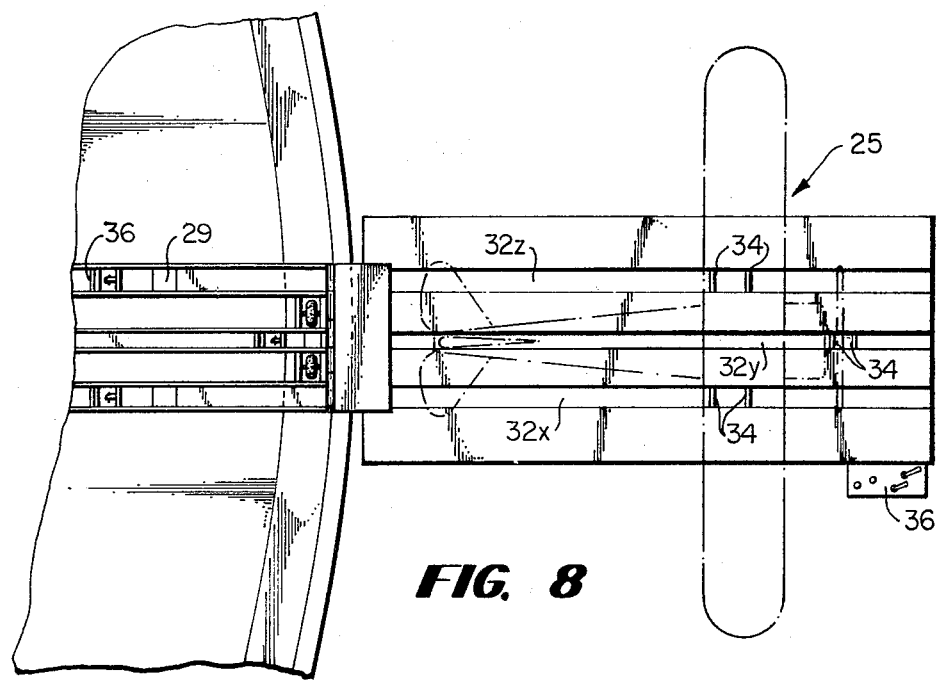
FIG. 8 is a top view showing more details of the elevator.

As shown in FIG. 8, the lift platform is of light weight construction having three tracks 32x, 32y, 32z, suitably positioned to receive the landing gear of airplanes, each track 32 being channelled to prevent aircraft wheels from moving off them. The center track 32y is smaller than outer tracks 32x and 32z so that the inner track will confine landing gear received to thereby position the center of the craft while the outer tracks will accommodate various wheel base sizes. The tracks 32 each contain landing gear stops 34 which for safety reasons are manually released when the aircraft is to be unloaded. Stops 34 are lowered when elevator 25 is at the lower, ground level and raise automatically when the elevator moves so that the aircraft is then prevented from moving off in any direction. An area 36 contains the controls for operation of the elevator 25 by an attendant while on the elevator.

Aircraft of the type for which the hangar 1 is well suited — light, single engine with landing wheels — are normally moved by hand for short distances and are usually equipped with a tow bar attached to the nose wheel which allows the attendant to steer the craft as well as push or pull it. The elevator 25 is therefore designed to be large enough for an attendant to stand in while moving in front of the aircraft.

When an aircraft is backed off the elevator 25 onto the floors 5 or 9 of the hangar 1, it is prevented from going too far toward the center of the rotating structure by permanent safety stops 36 (FIG. 4) on the outer floor tracks 5x, 5z and 9x, 9z, located to engage the wheels on the front landing gear. The distance from tail to the back of the main landing gear on the type of aircraft involved is sufficiently standard to allow for placement of the position of permanent stops 36 a distance from the column 13 sufficient to keep the tail of any aircraft from touching the column 13.

Figure 9:
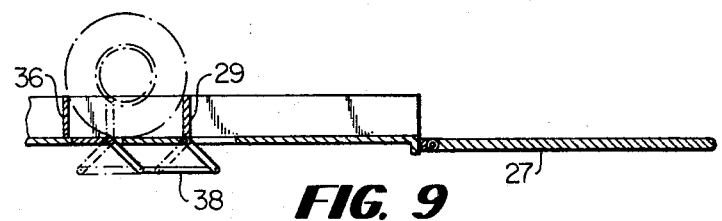
FIG. 9 illustrates an alternative embodiment to that shown in FIGS. 5 and 6.

FIG. 9 shows an alternative to the stop mechanisms described in connection with FIGS. 5 and 6. The stops located near the center of hangar 1 are permanently extended safety stops 36. The stops 36 are linked at 38 to outer side stops 29 so that upon aircraft wheels striking the rear stops 36, linkage 38 is activated to move the front stops 29 upward. The landing gear is then barred by the stops 36 and 29 from movement in either direction. The similarity of aircraft tire diameters permits a single distance between the front stops 29 and the rear stops 36. The front stops 29 when extended require manual release by the attendant prior to moving the aircraft from the rotating inner structure to the elevator.

Table 1 lists major dimensions of typical aircraft stored in hangar 1 in primary applications contemplated. The maximum gross weight anticipated is 3,600 pounds. It is apparent from Table 1 that the larger aircraft are roughly similar in size and form. Consideration of the data in Table 1 also makes possible reasonably accurate computation of the space saved in accordance with this invention where the wings overlap the body portions of adjoining aircraft, as contrasted with storage on a single level with the aircraft positioned either wing-tip to wing-tip or wing-tip to tail.

Figure 10:
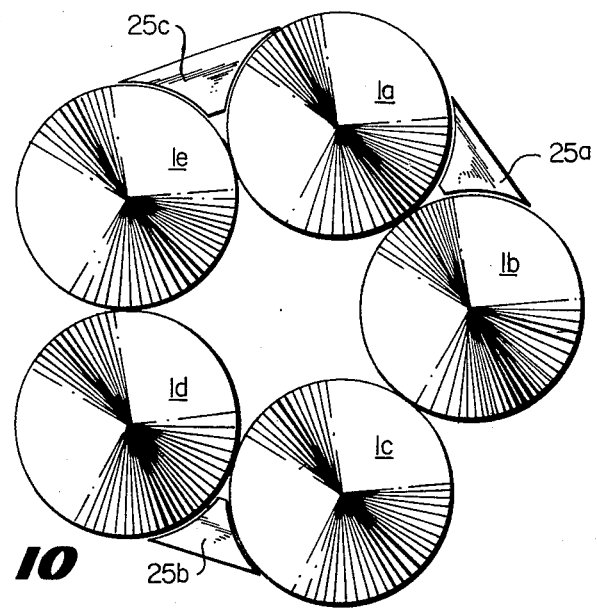
FIG. 10 illustrates a cluster arrangement of the hangars including groups of two hangars sharing service of one elevator.

The clustering of two or more hangars 1 is a useful and valuable application which requires a minimum of elevators 25 while providing a compact arrangement with correspondingly reduced cost of construction per hangar unit. A preferred embodiment in accordance with one such arrangement is shown in FIG. 10.

The cluster comprises five of the two level, rotatable floor hangars as previously described 1a, 1b, 1c, 1d and 1e positioned in a circle. An elevator 25a for lifting aircraft as previously described, is positioned contiguous to hangars 1a and 1b. Similarly elevator 25b is located contiguous to hangars 1c and 1d, and elevator 25c is similarly located to serve 1e and 1a. (Of course, where further hangar space is needed, another hangar could be added and served by elevator 25a or elevator 25c, so that each elevator serves two hangars.)

The elevator 25 previously described for use with a single hangar was not of a design especially adapted to serve structures on either side, and the external configuration of such a design would be the most convenient, generally rectangular. The elevators for use with two hangars include a floor with turntable or the like to unload and receive aircraft from the two directions. Accordingly, such elevators preferably would be triangular so that the floor area extends close to both hangars.

It will be apparent that this invention can take various external forms, some immediately apparent and some which may be developed in the future, but which are within the basic substance and contribution of this invention. It will also be apparent that various separate features and elements of this invention may be employed, whether for limited purposes or at the sacrifice of optimum advantages, but nevertheless within the basic substance and contribution of this invention. Accordingly, the patent coverage granted should not be limited by the preferred embodiments disclosed, but should be as provided by law with particular reference to the accompanying claims.

TABLE 1

|  | Beech Musketeer | Piper Aero | American Yankee | Cessna Skylane | Bonanza 36 |
|---|---|---|---|---|---|
| Wing span | 32 ft. 9 in. | 30 ft. | 19 ft. 3 in. | 36 ft. 2 in. | 32 ft. 9 in. |
| Height | 8 ft. | 8 ft. | 6 ft. 9 in. | 8 ft. 10½ in. | 8 ft. 5 in. |
| Length | 25 ft. | 24 ft. 2 in. | 19 ft. 3 in. | 28 ft. ½ in. | 26 ft. 4 in. |
| Tread | 11 ft. 10 in. | 10 ft. 6 in. | 99 inches | 7 ft. 11½ in. | 9 ft. 7 in. |
| Wheel base | 6 ft. 4 in. | 7 ft. 6 in. |  |  |  |

What is claimed is:

1. A hangar for winged aircraft comprising
a first floor on substantially one horizontal level for supporting said aircraft,
a second floor on substantially a second horizontal level for supporting said aircraft, said second level being higher vertically than said one level a distance such that wings of said aircraft on said second floor clear wings of said aircraft on said first floor, said second floor having discontinuous portions adapted to receive body portions of aircraft on said first floor, said first floor and said second floor being mounted as a unit for rotation.

2. The hangar as in claim 1 with an elevator positioned near it for lifting aircraft to said second floor.

3. The hangar as in claim 1 in which at least one of said floors includes extension members which are extendable for loading aircraft and which are movable away from the loading position, and in which said floors also include stop members for limiting movement of landing gear of loaded aircraft, said stop members being linked to at least one of said extension members for upward movement into a position to limit said movement of landing gear in response to movement of said at least one extension member away from the loading position.

4. The hangar as in claim 1 in which at least one of said floors include first stop members positioned to abut landing gear of aircraft prior to movement of the aircraft more than a predetermined amount toward the center of said hangar, second stop members associated with and linked to one of said first stop members for upward movement into a position to limit movement of landing gear of aircraft outward from the center of said hangar in response to pressure of landing gear on its associated first stop member.

5. The hangar as in claim 1 in which at least said second floor is comprised of sets of tracks of limited width, each set suitable to receive landing gear of aircraft and supported near the center of said hangar by a rotatable, supporting column.

6. The hangar as in claim 5 in which the tracks of at least one of said floors includes extension members which are extendable for loading aircraft and which are movable away from the loading position, and in which said floor tracks also include stop members for limiting movement of landing gear of loaded aircraft, said stop members being linked to at least one of said extension members for upward movement into a position to limit said movement of landing gear in response to movement of said at least one extension member away from the loading position.

7. The hangar as in claim 5 in which the tracks of at least one of said floors includes first stop members positioned to abut landing gear of aircraft prior to movement of the aircraft more than a predetermined amount toward the center of said hangar, second stop members associated with and linked to one of said first stop members for upward movement into a position to limit movement of landing gear of aircraft outward from the center of said hangar in response to pressure of landing gear on its associated first stop member.

8. The hangar as in claim 5 with an elevator positioned near it for lifting aircraft to said second floor.

9. The hangar as in claim 5 in which said tracks comprise sets of three tracks, the inner track being of width suitable to confine landing gear so as to serve as a centering guide for aircraft, and the outer tracks being sufficiently wide normally to accommodate the different widths of landing gear of different aircraft.

10. The hangar as in claim 9 with an elevator positioned near it for lifting aircraft to said second floor, said elevator floor comprising sets of three tracks, the inner track being of width suitable to confine landing gear so as to serve as a centering guide for aircraft, and the outer tracks being of limited width sufficiently wide normally to accommodate the different widths of landing gear of different aircraft.

11. The hangar as in claim 10 in which said first floor and said second floor are comprising of said sets of tracks, and in which said first floor tracks and said second floor tracks each include extension members which are extendable for loading aircraft and which are movable away from the loading position, and in which said floor tracks also include stop members for limiting movement of landing gear of loaded aircraft, said stop members being linked to at least one of said extension members for upward movement into a position to limit said movement of landing gear in response to movement of said at least one extension member away from the loading position.

12. A cluster of hangars comprising two hangars, each having two floors spaced vertically and adapted to store aircraft, and an elevator positioned to move aircraft to upper floors for storage in both said hangars, said elevator is triangular and positioned with sides near both said hangars and, said elevator having a floor comprising a set of three tracks, the inner tracks being of width suitable to confine a landing gear so as to serve as a centering guide for the aircraft, and the outer tracks being of limited widths sufficiently wide normally to accommodate the different widths of landing gear of different aircraft.

13. A hangar cluster comprising two hangars for winged aircraft and an elevator positioned to move aircraft to the upper floors of said hangars for storage in both said hangars, each of said hangars comprising;

a. a first floor on substantially one horizontal level for supporting said aircraft;

b. a second floor on substantially a second horizontal level for supporting said aircraft, said second level being higher vertically than said one level, a distance such that the wings of said aircraft on said second floor clear wings of said aircraft on said first floor;

c. said second floor having discontinuous portions adapted to receive body portions of aircraft on said first floor; and d. said first floor and said second floor being mounted as a unit for rotation.

14. A hangar cluster as in claim 13 wherein at least one of said first or second floors includes extension members which are extendable for loading aircraft and which are moveable away from the loading position, and in which said floors also include stop members for limiting movement of landing gear of loaded aircraft, said stop members being linked to at least one of said extension members for upward movement into a position to limit said movement of landing gear in response to movement of said at least one extension member away from the loading position.

15. A hangar cluster as in claim 14 wherein at least said second floor is comprised of sets of tracks of limited width, each set suitable to receive landing gear of aircraft and supported near the center of said hangar by a rotatable, supporting column.

16. A hangar cluster as in claim 13 wherein at least said second floor is comprised of sets of tracks of limited width, each set suitable to receive landing gear of aircraft and supported near the center of said hangar by a rotatable, supporting column, said tracks comprising sets of three tracks, the inner track being of width suitable to confine landing gear so as to serve as a centering guide for the aircraft, and the outer tracks being sufficiently wide normally to accommodate the different widths of landing gear of different aircraft and wherein an elevator is positioned near each of said hangars for lifting aircraft to said second floor, said elevator floor comprising sets of three tracks, the inner track being of width suitable to confine landing gear so as to serve as a centering guide for aircraft, and the outer tracks being of limited width sufficiently wide normally to accommodate the different widths of landing gear of different aircraft.

17. A hangar cluster as in claim 16 in which said elevator is triangular and positioned with sides near both said hangars.

18. A hangar cluster as in claim 16 in which said first floor and said second floor are comprised of said sets of tracks, and in which said first floor tracks and said second floor tracks each include extension members which are extendable for loading aircraft and which are moveable away from the loading position, and in which said floor tracks also include stop members for limiting movement of landing gear of loaded aircraft, said stop members being linked to at least one of said extension members for upward movement into a position to eliminate said movement of landing gear in response to movement of said at least one extension member away from the loading position.

19. A hangar cluster as in claim 13 in which said elevator is triangular and positioned with sides near both said hangars.

* * * * *